United States Patent [19]
Tanaka

[11] Patent Number: 5,246,658
[45] Date of Patent: Sep. 21, 1993

[54] METHOD OF MANUFACTURING WORKING GLOVE

[75] Inventor: Akeo Tanaka, Himeji, Japan
[73] Assignee: Showa Kako Co., Ltd., Himeji, Japan
[21] Appl. No.: 789,920
[22] Filed: Nov. 12, 1991
[30] Foreign Application Priority Data
  Jul. 15, 1991 [JP] Japan .................................. 3-172862
[51] Int. Cl.⁵ ....................... B29C 41/14; B29C 41/20
[52] U.S. Cl. .................................... 264/234; 264/257;
                             264/294; 264/343; 264/347
[58] Field of Search ............... 264/301, 303, 307, 343,
                          264/215, 347, 257, 294, 236, 234

[56] References Cited
U.S. PATENT DOCUMENTS 3,079,274 2/1963 Marsden et al. ..................... 264/301
3,411,982 11/1968 Kavalir et al. ....................... 264/307

Primary Examiner—Jan H. Silbaugh
Assistant Examiner—Angela Ortiz
Attorney, Agent, or Firm—Joseph W. Farley

[57] ABSTRACT

A method of manufacturing a open-back type working glove. A fiber-made glove is fitted on a dipping hand block, and same is dipped in a stock solution of a rubber latex composition. After the glove and hand block is removed from the stock solution, the solution deposited on the glove in an open-back fashion is heated so as to allow it to be semi-vulcanized. Then, the glove is removed from the dipping hand block and is immersed in water or warm water to allow the rubber coat in semi-vulcanized condition to swell and soften. Finally, the glove is fitted on a setting hand block having a thumb portion projecting considerably beyond the palm portion, with other four finger portions curved toward the palm portion, and the rubber coat is heated for final vulcanization.

1 Claim, 6 Drawing Sheets 5,246,658

METHOD OF MANUFACTURING WORKING GLOVE

FIELD OF THE INVENTION

This invention relates to a method of manufacturing working gloves.

BACKGROUND OF THE INVENTION

Working gloves made of a fiber material are known of the type in which portions of the glove other than the back portion excepting tips of the five finger portions are coated with rubber or resin coating. Such working glove is air permeable with respect to its back portion and finger backs. For this reason, the working glove has an advantage that it is less likely to cause stuffy feel if worn for a period of time.

In the manufacture of working gloves of this type, it has been known to use a dipping hand block having a back portion and a palm portion, both being positioned generally horizontally, five finger portions extending generally straight from the back portion, base lines of forks between adjacent fingers being positioned in same horizontal plane as or lower than the palm portion, the forks being slanted long in the longitudinal direction of the palm portion. More particularly, the fiber-made glove is first fitted on the dipping hand block, and same is held in a slightly tilted condition so that the five finger portions will be oriented slightly downward. The work is then dipped in a stock solution of a rubber latex composition in such a way that the back portion and the upper surface of the five finger portions will not sink into the solution, with the interfinger fork portions in particular being dipped deep in the stock solution. Subsequently, the work is removed from the stock solution and the solution deposited on the glove is heat treated, whereby a coat is formed on the glove.

The working glove thus manufactured is a so-called open-back type working glove in which the back portion and the back of five finger portions other than their tips are not coated, whereas other portions have a coat formed thereon.

Since the dipping hand block is of a flat configuration, the glove made in the above described manner is a flat-configured one such that the five finger portions are positioned in substantially same plane as the palm portion.

In contrast to this, the construction of the human hand is such that the thumb projects considerably beyond the palm and, in addition, the thumb and four other fingers are movable freely to perform any desired work. Therefore, when a glove made on such a flat dipping hand block as above mentioned is worn, the glove does not fit the hand, feels uncomfortable, lacks ease of working with, and tends to tire the hand too much when long worn in operation.

SUMMARY OF THE INVENTION

The invention is directed to overcoming these problems, and accordingly it is a primary object to provide a method of manufacturing a working glove of the open-back type which readily fits the human hand, is less likely to tire the hand when long worn in operation, and can enhance working efficiency when it is worn.

In order to accomplish this object, according to the invention there is provided a method of manufacturing a working glove, which comprises the steps of:

fitting a fiber-made glove on a dipping hand block having a back portion, a palm portion, and five finger portions extending from the palm portion on and along generally the same plane as the surface of the palm portion, dipping the dipping hand block and the fiber-made glove in a stock solution of a rubber latex composition so as not to allow the back portion and the upper surface of the five finger portions of sink into the solution, removing the dipping hand block and fiber-made glove from the stock solution and heating same so as to cause the solution deposited on the glove to be semi-vulcanized, removing the fiber-made glove from the dipping hand block and immersing the glove in water or warm water to swell and soften the semi-vulcanized rubber coat formed on the glove, fitting the rubber coated fiber-made glove on a setting hand block having a thumb portion projecting considerably beyond the palm portion, with other four finger portions curved toward the palm portion, and then heating the rubber coat for final vulcanization.

According to the above stated method, the fiber-made glove fitted on the dipping hand block is coated with rubber in an open-back fashion, and the rubber coat in its semi-vulcanized state is caused to swell and soften in water or warm water. Therefore, the glove can be readily fitted on the setting hand block, and the rubber coat can be uniformly stretched along the configuration of the setting hand block. Thus, no part of the rubber coat is particularly thinner than the rest and, by finally vulcanizing the coat, a glove conforming to the configuration of the setting hand block is obtained, which is then stably hardened while being kept in its style and size as such. The finished glove thus made readily fits the human hand, is unlikely to tire the hand even when long worn in actual operation, can enhance working efficiency, has excellent air permeability, and is free from stuffy feel.

Generally, in the manufacture of rubber latex products, in order to improve product quality it is necessary to carry out rinsing to thereby eliminate impurities and substances detrimental to the properties of the product. According to the method of the invention, the rubber coat in its semi-vulcanized state is caused to swell and soften in water or warm water. In this process, such impurities and detrimental substances can be washed away and removed. Therefore, no particular step of washing is required. The invention is advantageous also in this respect.

EXAMPLE

One example of the method of the invention will now be described with reference to the accompanying drawings.

Figure 3:
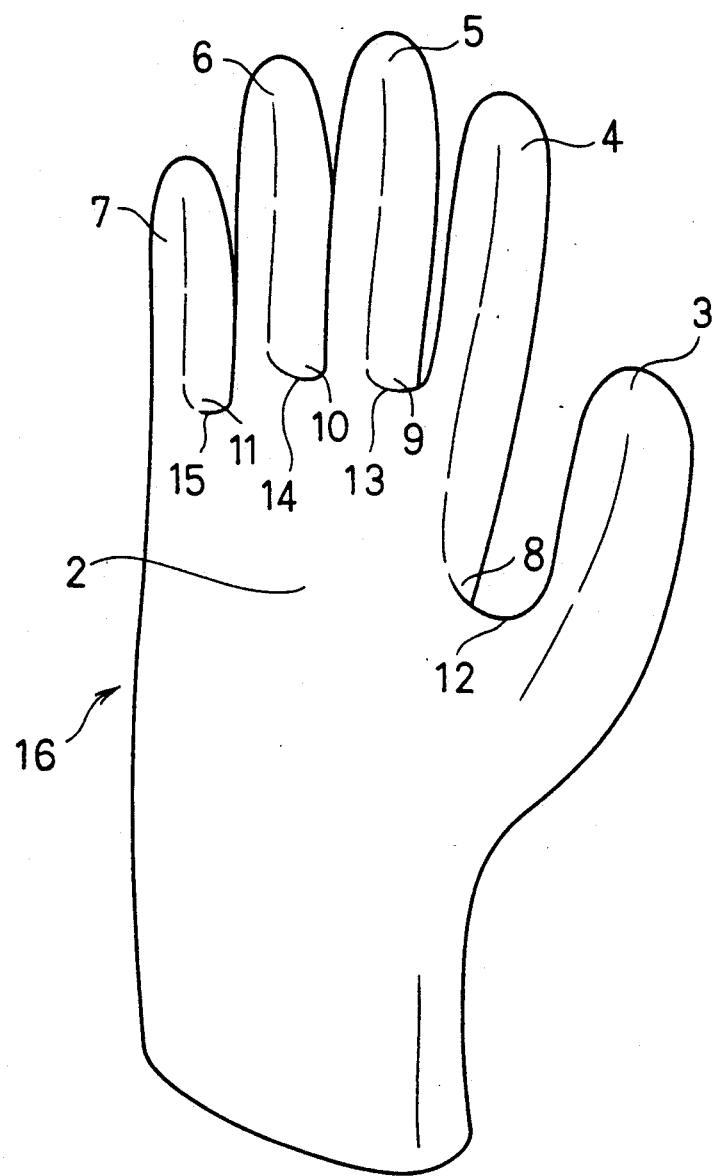
FIG. 3 is a perspective view of a dipping hand block for use in the method of the invention.
Figure 4:
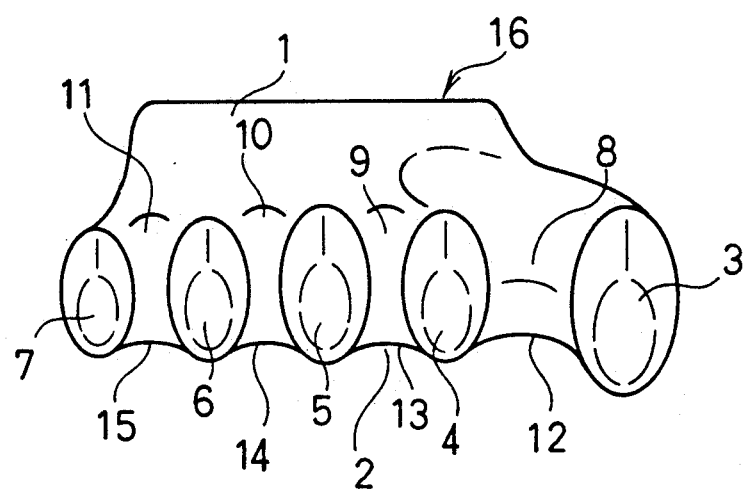
FIG. 4 is a front view of the dipping hand block shown in FIG. 3.
Figure 5:
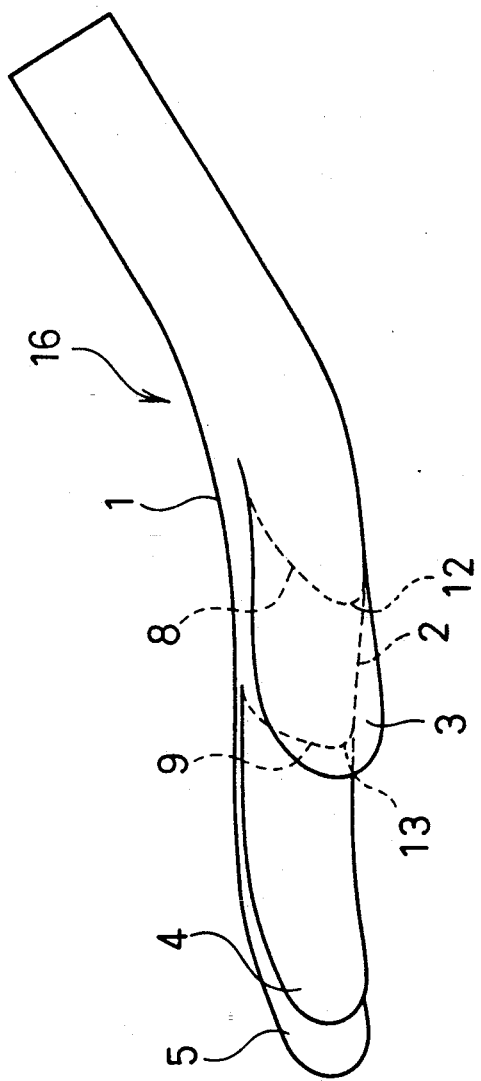
FIG. 5 is a side view of the dipping hand block in FIG. 3.

FIGS. 3 to 5 illustrate a dipping hand block 16. As shown, the dipping hand block 16 is such that when the block is in use, the back portion 1 and palm portion 2 are generally horizontally positioned and five finger portions 3, 4, 5, 6 and 7 extend generally straight from the back portion 1. When the block is in use, base lines 12, 13, 14 and 15 of forks 8, 9, 10 and 11 between adjacent fingers 3, 4, 5, 6 and 7 are positioned in same horizontal plane as or lower than the palm portion 2. Forks 8, 9, 10 and 11 are slanted in the longitudinal direction of the palm portion 2.

Figure 6:
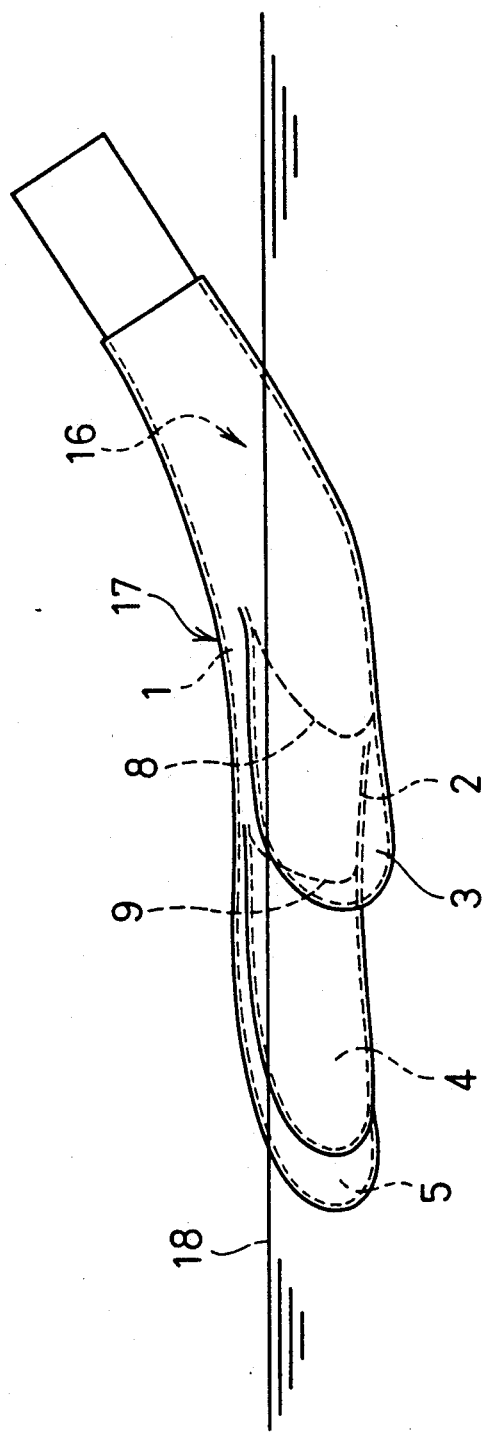
FIG. 6 is a side view showing a fiber-made glove fitted on the dipping hand block as dipped in stock solution.

Initially, the dipping hand block 16 is preheated to a temperature of 80° to 100° C. according to the heat sensitive process. A fiber-made glove (e.g., of cotton) 17 is fitted on the preheated dipping hand block 16, and same is dipped, as shown in FIG. 6, in stock solution 18 of a rubber latex composition prepared in the blend ratio shown in Table 1 below, for 20 to 30 sec. In this case, as shown in FIG. 6, the work is held in slightly tilted condition so as to orient the five finger portions 3, 4, 5, 6 and 7 slightly downward so that the back portion 1 and upper surface of five finger portions 3, 4, 5, 6 and 7 other than their tips will not sink into the stock solution 18. Forks 8, 9, 10 and 11 between finger portions 3, 4, 5, 6 and 7 are dipped deep into the stock solution 18. Subsequently, the fiber-made glove 17, together with the dipping hand block 16, is removed from the stock solution 18. Thus, the fiber-made glove 17 has been deposited with stock solution in openback fashion.

TABLE 1

| | |
|---|---|
| Natural rubber latex (solid content) | 100 parts (wt) |
| Stabilizer | 0.3 parts |
| Sulfur | 1 part |
| Zinc oxide | 1 part |
| Vulcanizing accelerator | 1 part |
| Age resister | 1 part |
| Pigment | 1.5 parts |
| Heat-sensitive gelling agent | 1 part |

Thereafter, the solution deposited on the fiber-made glove 17 is heated at a temperature of about 100° C. for about 20 min for primary vulcanization. Thus, a rubber coat 19 is formed on the glove 17. This rubber coat 19 has considerable strength that is sufficient to make the glove 17 withstand some degree of pull force which may otherwise cause breakage. However, such degree of vulcanization is insufficient to form a crosslinked mesh structure.

Figure 1:
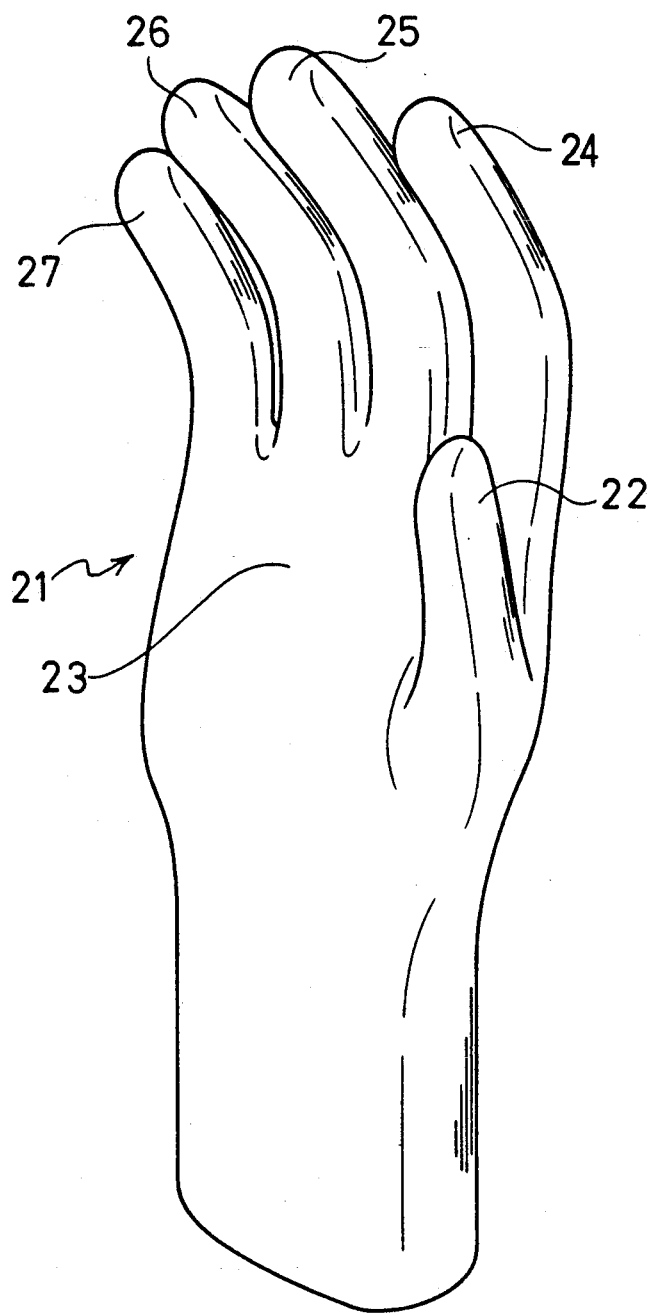
FIG. 1 is a perspective view of a setting hand block for use in the method of the invention.

Therefore, the fiber-made glove 17 is then removed from the dipping hand block 16 and is immersed in water or warm water for about 30 min to cause the rubber component of the coat 19 to swell and soften. As a consequence, the coat 19 becomes easy to stretch so that the glove 17 on which the coat 19 is formed can readily be fitted on a setting hand block 21 of the type shown in FIG. 1.

The setting hand block 21 is shaped to a form resembling the human hand more closely such that the thumb portion 22 projects considerably beyond the palm portion 23 and other four finger portions 24, 25, 26 and 27 are curved toward the palm portion 23.

The fiber-made glove 17 on which the coat 19 has been formed is fitted on the setting hand block 21 and is then heated at a temperature of about 100° to 120° C. for about 40 to 60 min for secondary vulcanization. Through this process of secondary vulcanization, a crosslinked mesh structure is satisfactorily formed in the rubber coat 19 of the glove 17, so that the glove 17 formed with the rubber coat 19 is forcedly shaped along the pattern of the setting hand block 21.

Figure 2:
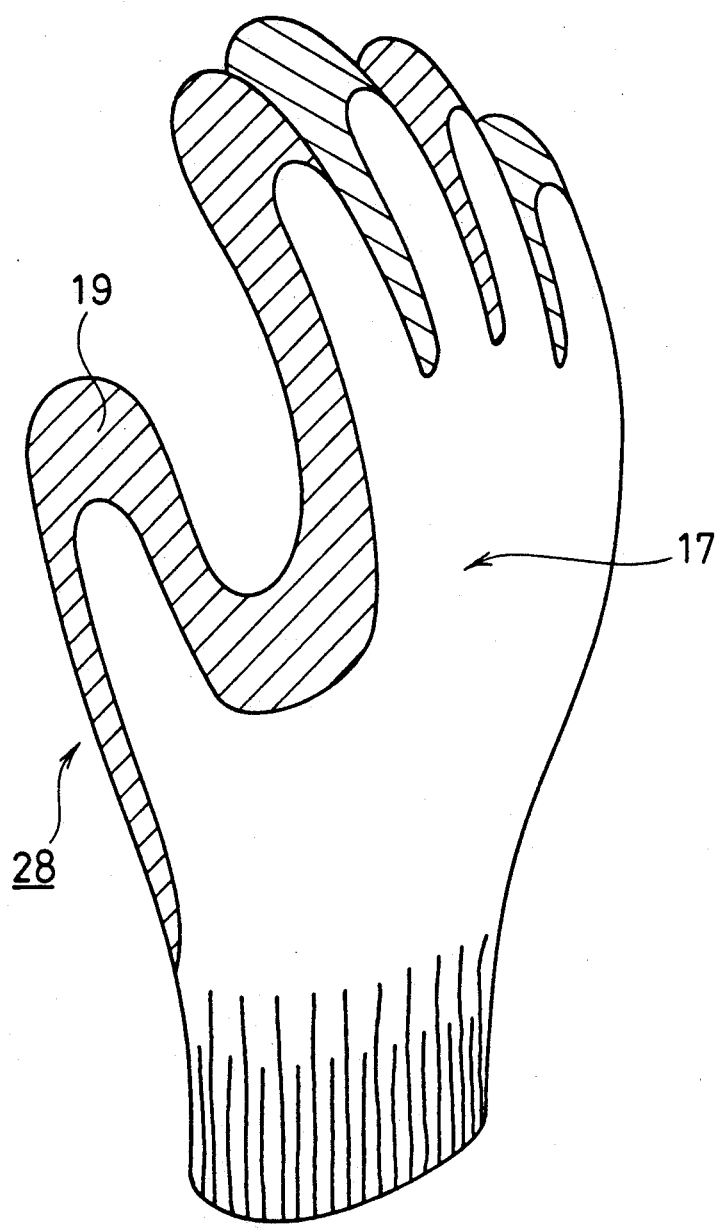
FIG. 2 is a perspective view of a working glove manufactured according to the method of the invention.

When the process of secondary vulcanization is completed, there is already made a glove of the open-back type with a rubber coat 19 formed over portions where such coat is required and having good air permeability. FIG. 2 shows the glove as removed from the setting hand block 21. As can be seen from the figure, the glove obtained is closely akin in shape to the human hand, involves less bagginess in the palm portion, can readily fit on the hand, and is comfortable to wear.

In the foregoing example, stock solution is deposited on the fiber-made glove according to the heat sensitive process. Alternatively, some other technique, such as coagulant dip process, may be employed for the purpose.

What is claimed is:

1. A method of manufacturing a working glove, which comprises the steps of:

fitting a fiber-made glove on a dipping hand block having a back portion, a palm portion, and five finger portions extending from the palm portion on and along generally same plane as the surface of the palm portion, dipping the dipping hand block and the fiber-made glove in a stock solution of a rubber latex composition so as not to allow the back portion and the upper surface of the five finger portions to sink into the solution, removing the dipping hand block and fiber-made glove from the stock solution and heating same so as to cause the solution deposited on the glove to be semi-vulcanized, removing the fiber-made glove from the dipping hand block and immersing the glove in water or warm water to swell and soften the semi-vulcanized rubber coat formed on the glove, fitting the rubber coated fiber-made glove by stretching the softened semi-vulcanized rubber coat on a setting hand block having a thumb portion projecting considerably beyond the palm portion, with other four finger portions curved toward the palm portion, heating the rubber coat for final vulcanization to form the rubber coated fiber-made glove to the configuration of the setting hand block, and removing the formed rubber coated fiber-made glove from the setting hand block.

* * * * *